US011289078B2

(12) United States Patent
Pohl

(10) Patent No.: US 11,289,078 B2
(45) Date of Patent: Mar. 29, 2022

(54) VOICE CONTROLLED CAMERA WITH AI SCENE DETECTION FOR PRECISE FOCUSING

(71) Applicant: Intel Corporation, Santa Clara, CA (US)

(72) Inventor: Daniel Pohl, Puchheim (DE)

(73) Assignee: Intel Corporation, Santa Clara, CA (US)

( * ) Notice: Subject to any disclaimer, the term of this patent is extended or adjusted under 35 U.S.C. 154(b) by 348 days.

(21) Appl. No.: 16/456,523

(22) Filed: Jun. 28, 2019

(65) Prior Publication Data

US 2019/0392831 A1 Dec. 26, 2019

(51) Int. Cl.
| | |
|---|---|
| *G10L 15/00* | (2013.01) |
| *G10L 15/26* | (2006.01) |
| *G10L 15/22* | (2006.01) |
| *G06F 3/16* | (2006.01) |
| *H04N 5/232* | (2006.01) |
| *G06N 3/08* | (2006.01) |
| *G06F 40/56* | (2020.01) |

(52) U.S. Cl.
CPC .............. *G10L 15/22* (2013.01); *G06F 3/167* (2013.01); *G06F 40/56* (2020.01); *G06N 3/086* (2013.01); *H04N 5/23222* (2013.01)

(58) Field of Classification Search
CPC ....... G06F 3/167; G06F 40/56; G06N 3/0445; G06N 3/0454; G06N 3/08; G06N 3/086; G10L 15/22; H04N 5/23212; H04N 5/23216; H04N 5/23222; H04N 5/23293

USPC .......................................................... 704/235
See application file for complete search history.

(56) References Cited

U.S. PATENT DOCUMENTS

| | | | | | |
|---|---|---|---|---|---|
| 4,951,079 | A | * | 8/1990 | Hoshino | ................ G03B 17/38 396/56 |
| 5,027,149 | A | * | 6/1991 | Hoshino | ................ G03B 17/38 396/56 |

(Continued)

OTHER PUBLICATIONS

Westwood United Methodist Church, "20150408183930-focus-distance-view-startup-marketing," retrieved from westwoodunitedmethodist.org/20150408183930-focus-distance-view-startup-marketing/, Jul. 13, 2017, 1 page.

(Continued)

*Primary Examiner* — Khai N. Nguyen
(74) *Attorney, Agent, or Firm* — Jordan IP Law, LLC

(57) ABSTRACT

An apparatus, method and computer readable medium for a voice-controlled camera with artificial intelligence (AI) for precise focusing. The method includes receiving, by the camera, natural language instructions from a user for focusing the camera to achieve a desired photograph. The natural language instructions are processed using natural language processing techniques to enable the camera to understand the instructions. A preview image of a user desired scene is captured by the camera. Artificial Intelligence (AI) is applied to the preview image to obtain context and to detect objects within the preview image. A depth map of the preview image is generated to obtain distances from the detected objects in the preview image to the camera. It is determined whether the detected objects in the image match the natural language instructions from the user.

25 Claims, 11 Drawing Sheets

(56) References Cited

U.S. PATENT DOCUMENTS

| | | | | |
|---|---|---|---|---|
| 5,749,000 | A * | 5/1998 | Narisawa | G02B 7/28 396/121 |
| 6,104,430 | A * | 8/2000 | Fukuoka | H04N 1/00127 348/231.6 |
| 7,432,952 | B2 * | 10/2008 | Fukuoka | H04N 1/00127 348/207.1 |
| 8,917,905 | B1 * | 12/2014 | Dill | H05B 47/10 382/103 |
| 9,667,870 | B2 * | 5/2017 | Cheong | G06F 3/011 |
| 9,965,865 | B1 * | 5/2018 | Agrawal | G06K 9/00234 |
| 10,104,280 | B2 * | 10/2018 | Butts | H04N 5/232 |
| 10,178,293 | B2 * | 1/2019 | Butts | G10L 15/22 |
| 10,217,195 | B1 * | 2/2019 | Agrawal | G06T 7/11 |
| 10,293,483 | B2 * | 5/2019 | Grotmol | B25J 9/161 |
| 10,334,158 | B2 * | 6/2019 | Gove | G06F 3/04883 |
| 10,409,079 | B2 * | 9/2019 | Dewald | G03B 21/2066 |
| 10,447,966 | B2 * | 10/2019 | Ritchey | H04N 5/2251 |
| 10,540,976 | B2 * | 1/2020 | Van Os | G10L 15/26 |
| 10,630,887 | B2 * | 4/2020 | Choi | H04N 5/23216 |
| 10,817,129 | B2 * | 10/2020 | Reid | G06F 3/0482 |
| 10,855,921 | B2 * | 12/2020 | Milne | H04N 5/23245 |
| 2002/0054212 | A1 * | 5/2002 | Fukuoka | H04N 1/00127 348/207.99 |
| 2005/0195309 | A1 * | 9/2005 | Kim | H04N 5/232123 348/345 |
| 2010/0208065 | A1 * | 8/2010 | Heiner | G06F 3/011 348/143 |
| 2013/0021491 | A1 * | 1/2013 | Lee | G06T 5/50 348/222.1 |
| 2013/0063550 | A1 * | 3/2013 | Ritchey | G06F 3/015 348/36 |
| 2014/0192247 | A1 * | 7/2014 | Cheong | G06F 3/016 348/333.11 |
| 2015/0110355 | A1 * | 4/2015 | Dill | G06K 9/00369 382/103 |
| 2015/0331246 | A1 * | 11/2015 | Dewald | G02B 27/14 359/290 |
| 2016/0127641 | A1 * | 5/2016 | Gove | G06T 1/0007 348/143 |
| 2016/0285793 | A1 * | 9/2016 | Anderson | G06F 3/0484 |
| 2017/0115742 | A1 * | 4/2017 | Xing | G06F 3/0485 |
| 2017/0221484 | A1 * | 8/2017 | Poltorak | G06K 9/00302 |
| 2017/0374266 | A1 * | 12/2017 | Butts | H04N 5/232 |
| 2017/0374273 | A1 * | 12/2017 | Butts | G10L 15/22 |
| 2018/0176459 | A1 * | 6/2018 | Choi | H04N 5/23206 |
| 2018/0288320 | A1 * | 10/2018 | Melick | G01S 17/86 |
| 2018/0290298 | A1 * | 10/2018 | Grotmol | G05D 1/0246 |
| 2019/0018568 | A1 * | 1/2019 | Reid | G06F 16/739 |
| 2019/0392831 | A1 * | 12/2019 | Pohl | G06F 40/56 |
| 2020/0014848 | A1 * | 1/2020 | Gove | G01B 11/00 |
| 2020/0241874 | A1 * | 7/2020 | Chen | G06T 11/60 |
| 2020/0344415 | A1 * | 10/2020 | Milne | G10L 15/22 |
| 2020/0368616 | A1 * | 11/2020 | Delamont | A63F 13/25 |

OTHER PUBLICATIONS

Canon Professional Network, "Focus points: A single focusing point," retrieved from cpn.canon-europe.com/content/education/infobank/focus_points/a-single_focusing_point.do, Jun. 27, 2019, 3 pages.

Canon Inc., Canon EOS 7D Mark II Instruction Manual, Aug. 2014, p. 206.

Steinkellner, Kit, "Um, bees have just been added to the endangered species list and this is not good," retrieved from hellogiggles.com/news/bees-endangered-species-list/, Image 1, Oct. 2, 2016, 2 pages.

Young, Tom et al; "Recent Trends in Deep Learning Based Natural Language Processing," IEEE Computational Intelligence Magazine, Aug. 2018, pp. 55-75.

Vision Doctor, "Optic basics—calculation of the optics," retrieved from vision-doctor.com/en/optical-basics.html, Jun. 27, 2019, 4 pages.

Product Hunt, "Panda," retrieved from producthunt.com/posts/panda-93f85400-fc37-462b-a4f4-66ef18a48fe0, Jun. 7, 2018, 2 pages.

CameraRC Deluxe, "CameraRC Deluxe Voice Commands," retrieved from camerarc.com/index.php/voice-commands/, Jun. 27, 2019, 1 page.

Rehm, Lars, "Google Search on Android adds voice commands for camera," retrieved from dpreview.com/articles/6818750865/google-search-on-android-adds-voice-commands-for-camera, Mar. 20, 2014, 1 page.

Shaikh, Faizan, "Automatic Image Captioning using Deep Learning (CNN and LSTM) in PyTorch," retrieved from analyticsvidhya.com/blog/2018/04/solving-an-image-captioning-task-using-deep-learning/, Apr. 2, 2018, 7 pages.

Ghandi, Rohith, "R-CNN, Fast R-CNN, Faster R-CNN, YOLO—Object Detection Algorithms," retrieved from towardsdatascience.com/r-cnn-fast-r-cnn-faster-r-cnn-yolo-object-detection-algorithms-36d53571365e, Jul. 9, 2018, 9 pages.

Sergios Karagiannakos, "Semantic Segmentation in the era of Neural Networks," retrieved from sergioskar.github.io/Semantic_Segmentation/, Jan. 25, 2019, 5 pages.

Zhernovoy, Vadim, "Improving the Performance of Mask R-CNN Using TensorRT," retrieved from apriorit.com/dev-blog/580-mask-r-cnn-using-tensorrt, Nov. 16, 2018, 7 pages.

Canon Inc., Canon Speedlite 600EX II-RT Instruction Manual, Jan. 2016, pp. 1-148.

ePHOTOzine, "Using The Depth of Field Button," retrieved from ephotozine.com/article/using-the-depth-of-field-button-12056, Sep. 15, 2011, 2 Pages.

* cited by examiner

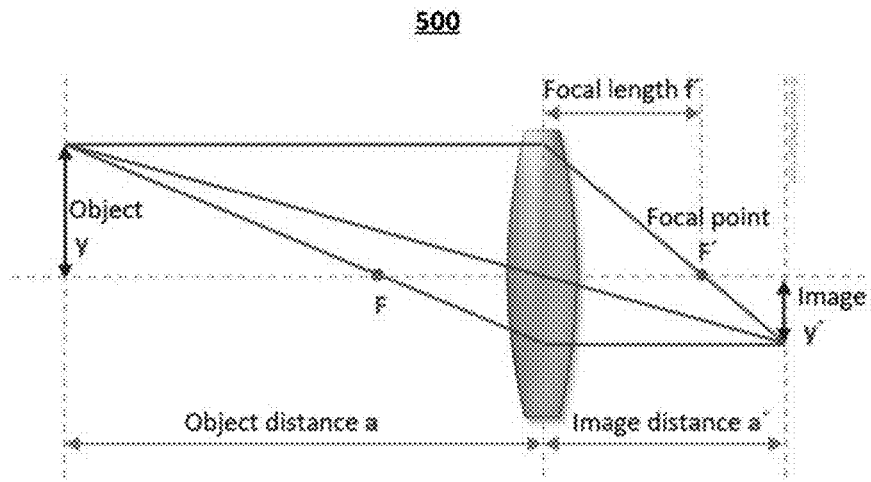

| | |
|---|---|
| Important parameters: image field, sensor size (both defined by the application), working distance, and focal length of the optics | |
| Image size y' - sensor size: | $y' = y * f' / (a - f')$ |
| Object size y - object field | $y = y' * (a / f' - 1)$ |
| Focal length f' - "lens type" | $f' = a / (y / y' + 1)$ |
| Object distance a - working distance | $a = f' * (y / y' + 1)$ |
| Image scale $\beta$ | $\beta = y' / y$ |
| Aperture angle 2w | $2w = 2 * \arctan(y' / 2 * 1/f')$ (in rad) |

FIG. 5

VOICE CONTROLLED CAMERA WITH AI SCENE DETECTION FOR PRECISE FOCUSING

TECHNICAL FIELD

Embodiments generally relate to camera technology. More particularly, embodiments relate to a voice-controlled camera with artificial intelligence (AI) scene detection for precise focusing.

BACKGROUND

With digital cameras, it is still hard for the user to select the right camera settings to enable the user to take a photograph in which the subject is focused as expected by the user. While experts know all the menus and buttons to select to obtain the correct focus points to be used, this is often complicated and does not work well for the majority of amateur photographers.

Touching the screen of the camera or smartphone to focus on a certain object is a workaround, but when the object moves or rotates around too much, problems occur. Tracking may be lost and there is no real information on how to recover automatic tracking.

Conventional voice control methods to operate a camera are limited to thumb control commands that have been directly mapped to voice control. For example, the user command "power off" will operate the same as one pressing the power off button. The ability for the camera to receive more complex camera tasks is needed to help the amateur photographer obtain expert-like photographs. However, doing more complex camera tasks such as, for example, asking the camera to focus on certain objects using natural language, and allowing the camera to execute the command would make it easier for the amateur photographer to obtain expert-like photographs.

BRIEF DESCRIPTION OF THE DRAWINGS

The various advantages of the embodiments will become apparent to one skilled in the art by reading the following specification and appended claims, and by referencing the following drawings, in which:

FIG. 5 is a diagram illustrating basic camera optics along with some of the camera optical formulas needed to adjust camera settings for precise focusing of a desired image according to an embodiment;

Figure 1:
FIG. 1 is an example of an out of focus photograph taken by an amateur photographer.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

DESCRIPTION OF EMBODIMENTS

Technology for a voice-controlled camera with artificial intelligence (AI) scene detection for precise focusing. In embodiments, a user may tell the camera what photograph it wants using natural language. In other words, the user may tell the camera what subject to take and how it wants to see the subject using voice commands. This is accomplished using natural language techniques. The camera, upon receiving the voice commands from the user, parses the voice commands for understanding. The camera captures a preview image of the user desired scene and applies artificial intelligence to the preview image to obtain context and to detect objects within the preview image. A depth map of the preview image is generated to obtain distances from the detected objects in the preview image to the camera. It is then determined whether the detected objects in the preview image match the voice commands from the user. If they match, the camera focus point and the camera settings based on the voice commands of the user are determined. The camera is focused and the camera settings are adjusted automatically to obtain the desired user image. A photograph of the desired user image is taken.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device). As used herein, the term "logic" and "module" may refer to, be part of, or include an application specific integrated circuit (ASIC), an electronic circuit, a processor (shared, dedicated, or group), and/or memory (shared, dedicated, or group) that execute one or more software or firmware programs having machine instructions (generated from an assembler and/or a compiler), a combinational logic circuit, and/or other suitable components that provide the described functionality.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

Embodiments are described for obtaining photographs using a voice-controlled camera with AI scene detection for precise focusing. Although embodiments are described for obtaining photographs, one skilled in the relevant art(s) would know that embodiments may also be applied to capturing video as well.

Whether the camera is a compact camera, a mirrorless camera, a DSLR (Digital Single-Lens Reflex) camera, a camera incorporated in a mobile phone, or any other type of camera, unless the owner is an expert, they probably don't know about all the menus and options available to them for setting objects into focus. And with the incorporation of cameras in mobile phones, one can safely say that the majority of camera owners may be classified as amateur photographers. Cameras having touchscreens allow a user to tap their finger on an area or object (i.e., the subject) they want to be in focus and take the photograph, but there are drawbacks to this feature. If the subject moves before the user has a chance to take the photograph, the focus may be lost. The feature is also limited in that it only allows the user to tap their finger on one subject. If the user wants more than one person to be in focus while having other persons in the scene be out of focus, this feature does not allow the user to accomplish this.

FIG. 1 is an example of a photograph 100 that was taken by an amateur photographer. As shown in photograph 100, the subject 102 is a female and is out of focus or blurred. The most likely reason for the female being out of focus or blurred in photograph 100 is that the focus point was wrongly selected. The focus point appears to be the center point of the image which only shows trees. There may be several other reasons for the blurriness. For example, the subject may have been moving and the selected shutter speed was not fast enough to freeze the movement. When the lighting is low, a slower shutter speed may be selected to let in more light, but that shutter speed may not be sufficient enough to keep the subject in focus. In another example, the depth of field (area in focus) may have been too shallow, thereby causing the remaining area in the scene to be blurred. A shallow depth of field may occur when a wide aperture is used, when one is too close to their subject, and when a long focal length is used. In yet another example, movement of the camera while taking the photograph may have caused the blurriness. There may be many reasons for the blurriness in the photograph. Amateur photographers may not be experienced enough to know the exact cause of the blurriness.

Embodiments aid the novice or amateur photographer by receiving complex camera commands from the user, such as, for example, asking the camera to focus on certain desired objects using natural language, and allowing the camera to execute the command using AI techniques, depth mapping, and determining aperture, shutter speed, ISO and any other optical settings that will enable the camera to provide precise focusing of the desired subjects in the scene.

The camera includes AI based on natural language processing to convert speech into sounds, words, and ideas that enable the identification of keywords. The keywords allow the camera to recognize commands and adjust camera settings to perform precise focusing as requested by the user. The camera, via a microphone, is constantly listening, but will only respond when it hears an appropriate wake word. In one embodiment, the wake word may be "camera". In other embodiments, the user may customize the wake word. Once the camera hears the wake word, it will then listen for and begin analyzing what the user says next, such as, the instructions from the user as to what the user is trying to capture in the photograph.

Figure 2A:
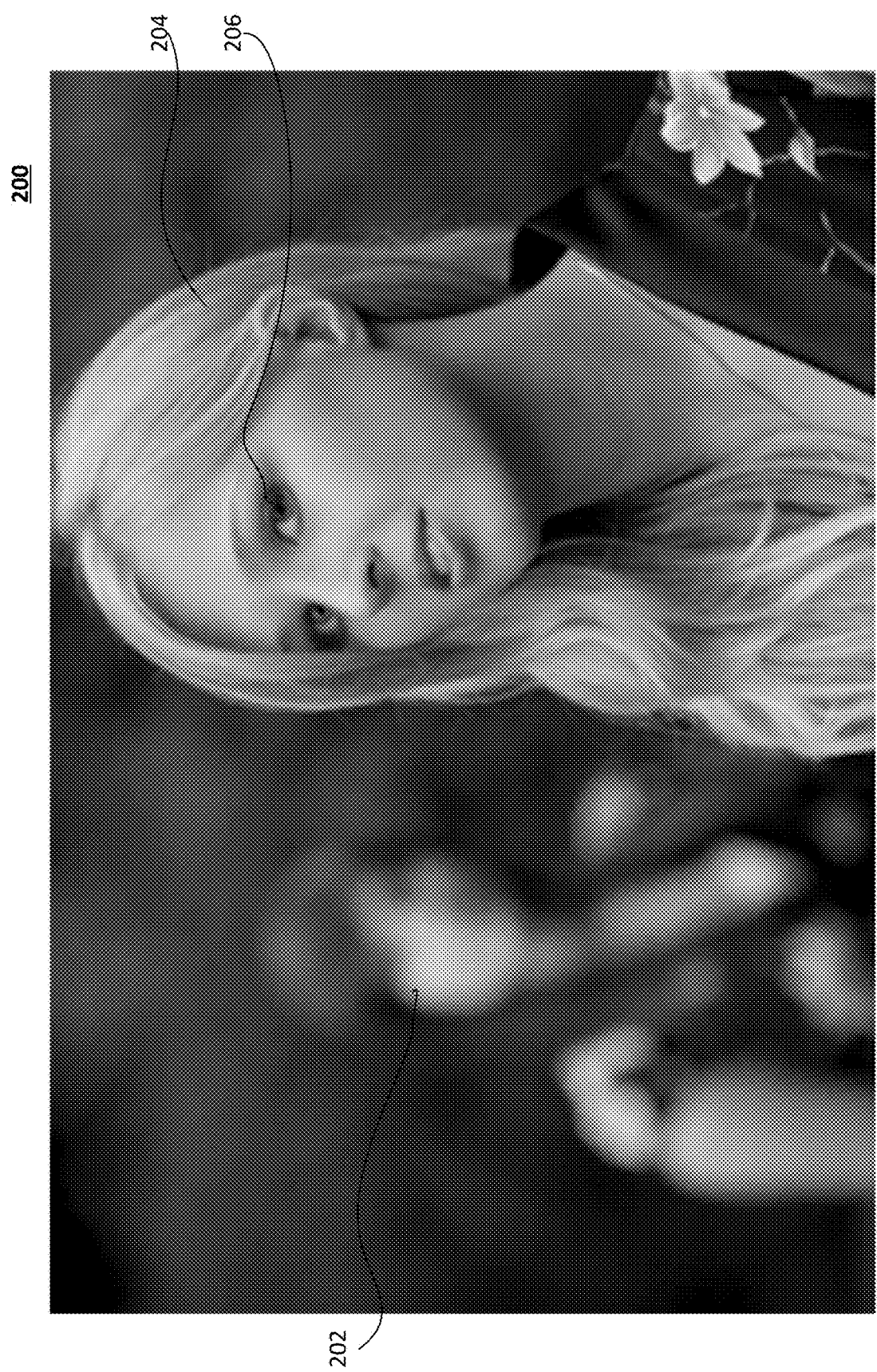
FIG. 2A is an example photograph illustrating a complex camera command used to provide precise focusing according to an embodiment.

FIG. 2A is an example photograph 200 illustrating a complex camera command used to provide precise focusing according to an embodiment. A user operating the camera, not shown, is standing in front of the scene to be photographed. The complex command given by the user is "camera, focus on the right eye, from my view, of the person in front." The complex command begins with the word "camera" to alert the camera that instructions for focusing the camera will follow. The photograph 200, shown in FIG. 2A, includes two people, a first person 202 shown further away from the user of the camera and a second person 204 shown as being closer to the user. The instruction requires that the right eye 206 of the second person 204 be in focus. The result is a photograph in which the second person 204 is in focus while the first person 202 is blurred.

Figure 2B:
FIG. 2B is another example photograph illustrating a complex camera command used to provide precise focusing according to an embodiment.

FIG. 2B is another example photograph 210 illustrating a complex camera command used to provide precise focusing according to an embodiment. As previously indicated, the user operating the camera is standing in front of the scene to be photographed but is not shown. The complex command given by the user is "camera, focus on the word 'FOCUS' close to me." Again, the complex command begins with the word "camera" to alert the camera that instructions for focusing the camera will follow. The photograph 210, shown in FIG. 2B, shows a telescope 212 with the word "FOCUS" 214 on the front of the telescope 212 in front of a body of water 216 and a background consisting of several buildings 218. The instruction requires that the word "FOCUS" 214 closest to the user be in focus. The result is the photograph 210 in which the telescope 212 with the word "FOCUS" 214 is in focus while the body of water 216 and the background 218 are blurred.

Figure 2C:
FIG. 2C is another example photograph illustrating a complex camera command used to provide precise focusing according to an embodiment.

FIG. 2C is another example photograph 220 illustrating a complex camera command used to provide precise focusing according to an embodiment. Again, the user operating the camera is standing in front of the scene to be photographed. The complex command given by the user is "camera, focus on the right part of the roof of the building closest to me." The complex command begins with the word "camera" to alert the camera that instructions for focusing the camera will follow. The scene captured in photograph 220 includes a first building 222 and a second building 224 surrounded by land 226 with trees 228 and a mountain 230 in the background. The instructions require that right side of the roof 232 of the building 224 closest to the user be in focus. The result is the photograph 220 in which the right side of the roof 232 of the building 224 is in focus while the first building 222, the land 226, trees 228, and the mountain 230 are slightly out of focus.

Figure 2D:
FIG. 2D is another example photograph illustrating a complex camera command used to provide precise focusing according to an embodiment.

FIG. 2D is another example photograph 250 illustrating a complex camera command used to provide precise focusing according to an embodiment. The user operating the camera is once again standing in front of the scene to be photographed. The complex command given by the user is "camera, focus on the head of the bee." Again, the complex command begins with the word "camera" to alert the camera that instructions for focusing the camera will follow. The scene captured in photograph 250 includes a bee 252 resting on a flower 254. The instructions require the head 256 of the bee 252 to be in focus. The result is the photograph 250 in which the head 256 of the bee 252 is in focus enough to see an eye 258 of the bee 252 while pedals 260 of the flower 254 are blurred.

Another example of an instruction for precise focusing may include, "camera, take a group photo with all people inside it being sharp." Besides focusing, embodiments could also be enhanced to provide a natural language interface to the camera for other settings. For example, an instruction might be "camera take a photo in which the two closest persons are in focus and where the one person behind is blurred." Another example from FIG. 2D might be "camera, make sure that both the bee 252 and a center portion 262 of the flower 254 are focused while the pedals 260 of the flower 254 are blurred." Such instructions might automatically adjust one or more of exposure time, aperture, ISO level, and/or any other optical settings of the camera needed to provide the requested image.

Figure 3:
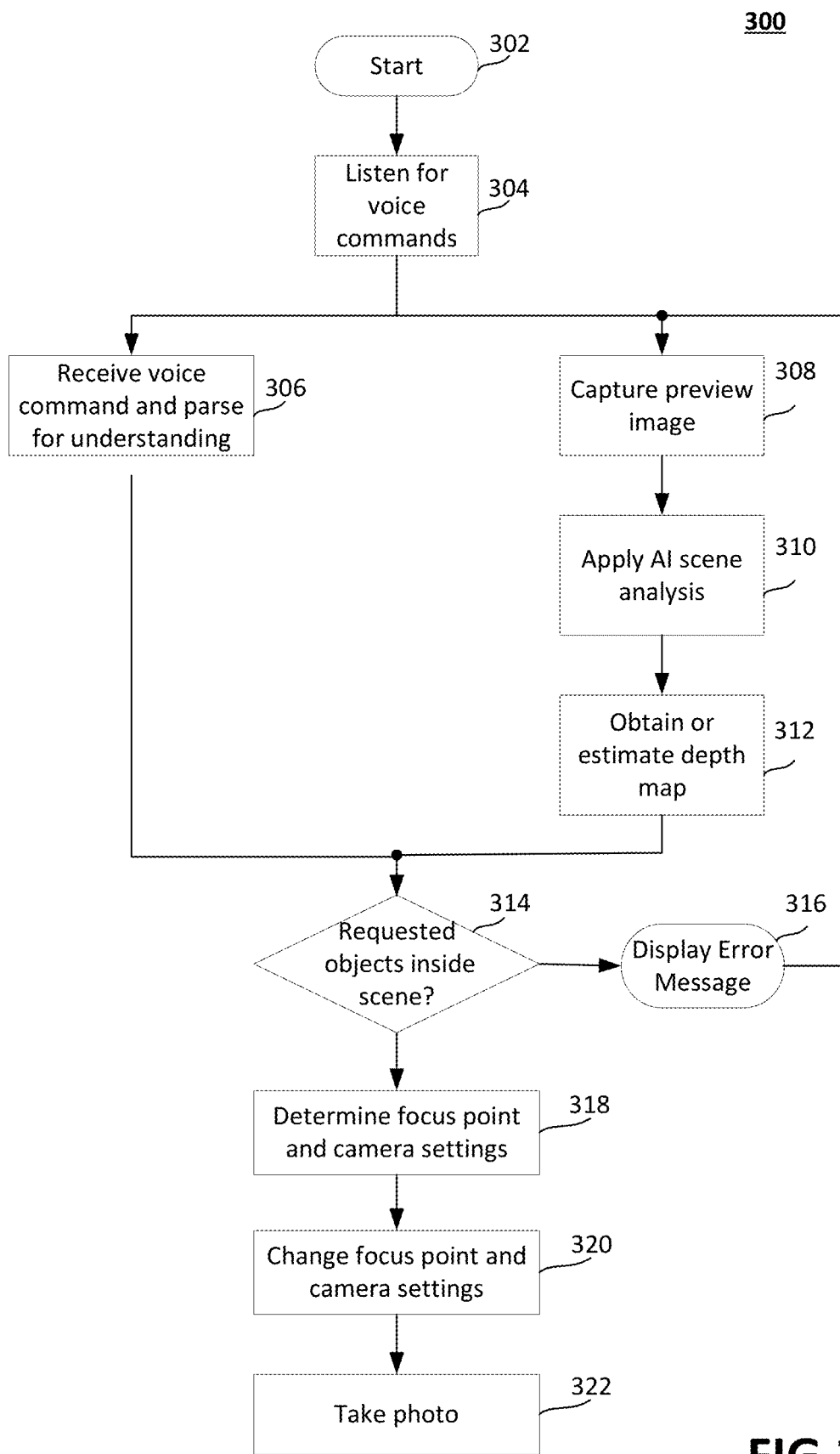
FIG. 3 is a flow diagram of an example method of performing precise camera focusing according to an embodiment.

FIG. 3 is a flow diagram of an example method 300 of performing precise camera focusing according to an embodiment. The method 300 may generally be implemented in a camera system 600 having a voice-controlled camera 620 with AI scene detection. More particularly, the method 300 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), and fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 300 may be written in any combination of one or more programming languages, including an object-oriented programming language such as JAVA, SMALLTALK, C++ or the like and conventional procedural programming languages, such as the "C" programming language or similar programming languages. Additionally, logic instructions might include assembler instruction, instruction set architecture (ISA) instructions, machine instruction, machine depended instruction, microcode, state setting data, configuration data for integrated circuitry, state information that personalizes electronic circuitry and/or other structural components that are native to hardware (e.g., host processor, central processing unit (CPU), microcontroller, etc.).

With the camera in the ON position, the process begins in block 302. The process immediately proceeds to block 304.

In block 304, the camera, via a microphone, listens for voice commands based on the wake word "camera." As previously indicated, a user may change the wake word during the initialization of the camera if he or she so desires. The wake word operates as a trigger to let the camera know that voice commands following the wake word are instructions for focusing the camera to achieve a desired photograph for the user. Upon hearing the wake word, the process proceeds to blocks 306 and 308 simultaneously to receive the instructions for focusing the camera to achieve the desired photograph for the user in block 306 and to simultaneously capture an image in block 308.

In block 306, once the instructions are received, natural language processing (NLP) begins by parsing the speech into keywords that will allow the camera to understand the task at hand. In an embodiment, the natural language process may use deep learning techniques, such as, for example, neural networks based on dense vector representations. Such neural networks may include, but are not limited to, convolutional neural networks (CNN), recurrent neural networks (RNN), and/or recursive neural networks. Other machine learning based NLP techniques may also be used to understand the received instructions for focusing the camera.

In block 308, as previously indicated, an image is captured. In one embodiment, the image may be the preview image captured by the camera when in preview mode. The process then proceeds to block 310.

Figure 4A:
FIG. 4A is an illustration of face detection on an image according to an embodiment.

In block 310, AI (Artificial Intelligence) techniques are applied to perform scene analysis on the captured preview image for detecting objects within the preview image and providing context as to what is in the image. Such object detection and context techniques may include, but are not limited to, Semantic Segmentation in real-time using Fully Convolutional Networks (FCN), R-CNN (Region-based Convolutional Neural Network), Fast R-CNN, Faster R-CNN, YOLO (You Only Look Once), and Mask R-CNN Using TensorRT, or a combination of one or more of the above. AI object detection usually returns in which image segment an object has been identified by placing bounding boxes around the recognized objects. FIG. 4A is an illustration of face detection on an image according to an embodiment. Bounding boxes 402 and 404 are shown in FIG. 4A as being placed around the faces of the two females 202 and 204 in the image. The process then proceeds to block 312.

In block 312, the distance from the recognized objects to the camera are determined.

In one embodiment, a depth map indicating the distances of the recognized objects from the camera may be obtained using monocular SLAM (Simultaneous Localization and Mapping). Using SLAM, the camera may build a map of the environment in which the photograph is to be taken. SLAM is well known to those skilled in the art.

In another embodiment, depth sensors, such as Intel® RealSense, may be used. The depth sensors are used to determine the distances of the recognized objects from the camera.

Figure 4B:
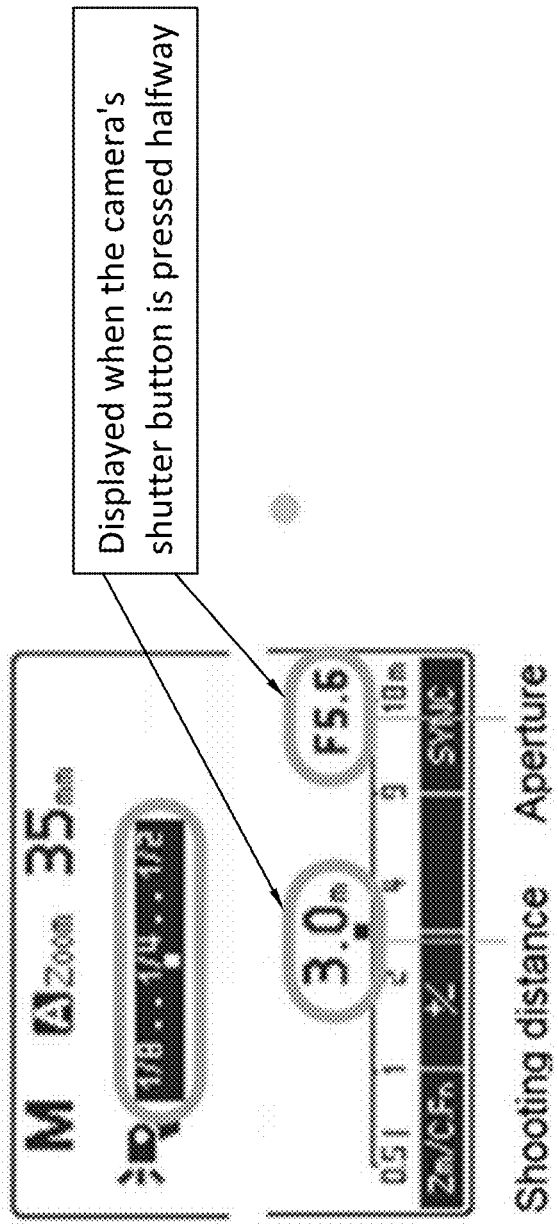
FIG. 4B is a display of external camera flashes from a Canon Speed Lite 600 XII-RT showing the shooting distance to an object in focus and the aperture value according to an embodiment.

In yet another embodiment, depending upon the type of camera used, many cameras, especially DSLR cameras, are able to estimate the distance from the camera to an object that is in focus. When the camera's shutter button pressed halfway, an indication of the shooting distance and the aperture value are displayed as shown in FIG. 4B.

Returning to FIG. 3, block 312, in yet another embodiment, obtaining a sample of the area of the bounded boxes or the exact pixel regions may be used to get a distance measurement. In one embodiment, the distance may be obtained by focusing on the center point of the bounded box or the exact pixel region. In another embodiment, instead of obtaining one sample for the center point of the bounded box or the exact pixel region, the distance may be obtained by taking several samples and obtaining an average over the samples.

Returning to FIG. 3, once the instructions are understood (block 306), the objects in the preview image are detected (block 310), and distance measurements have been obtained for the detected objects in the preview image (block 312), the process proceeds to decision block 314.

In decision block 314, it is determined whether the requested objects in the voice command are part of the scene obtained from the preview image. If it is determined that the requested objects in the voice command are not part of the scene obtained from the preview image, the process proceeds to block 316 where an error message is displayed to the user. The error message will indicate to the user that the requested objects are not found in the preview image. The process may then return back to block 308 to enable the user to capture another preview image, to apply AI scene analysis (block 310) for object detection in the preview image, and to obtain distance measurements (block 312) for the detected objects in the preview image.

Returning to decision block 314, if it is determined that the requested objects in the voice command are part of the scene obtained from the preview image, the process proceeds to block 318.

At this point, a list of identified objects along with the positions of the identified objects in the preview image, as indicated by the bounded boxes or the exact pixel segmentations, and their estimated distances or depths have been obtained. In block 318, the focus point and camera settings are determined based on the requirements provided by the voice commands, i.e., special camera instructions given by the user as to what is to be captured in the photograph and how the objects in the photograph are to be displayed.

In one embodiment, well known optical formulas for camera settings may be solved using the information above (objects to be captured, the position of the objects in the preview image, and the distance of the objects to the camera) to obtain the focus point and camera settings. FIG. 5 is a diagram illustrating basic camera optics along with some of the camera optical formulas needed to adjust the camera settings for precise focusing of the desired image. The basic camera optics of FIG. 5 and the associated camera optical formulas are well known to those skilled in the relevant art(s). Although all of the camera optical formulas that may be needed to adjust the camera settings for precise focusing are not listed in FIG. 5, one skilled in the relevant art(s) would know that additional camera optical formulas may also be used and can be found at the above-referenced web site. Such formulas may include, but are not limited to, aperture, shutter speed, ISO, depth-of-field, etc.

In some instances, the camera may or may not need to manipulate other settings besides focusing in order to provide the photograph requested by the user. For example, after the instruction "focus on the right eye of the closest person to me," the camera may be able to adjust the focus for the right eye and take the picture in whatever mode has already been set for the camera.

For instructions like "capture all three people and make sure they are in focus," the camera may experiment by setting an initial f/stop value and automatically looking at the results using the depth-of-field preview. The area of the three people would then be analyzed for sharpness based on edge detection. Next, the f/stop may be changed in one direction and then the results, using the depth-of-field preview, may be viewed again to see if the sharpness has increased or decreased. This process would repeat until a satisfying sharpness result is provided. This process could also be repeated for different camera settings, such as, for example, shutter speed and ISO.

For instructions like "capture all three people and make sure they are in focus," the camera optical formulas stated above may be used. The distance to the three people as well as where the three people are located in the image are known factors from using AI scene analysis and depth maps described above. An estimate of a focal plane to have all three persons in focus may need to be determined. One would not only want the nose of the closest object to be sharp but would also want other parts of the three people, such as arms, shoulders and other facial features located at different depths to also be in focus. This may require, for example, adding 20 cm before the three people and 50 cm behind the three people.

In another embodiment, various smartphone applications, like, for example, Photographer's Companion, may use the defined values listed above to estimate the value of various camera settings needed to accomplish the goal of precise focusing.

The process then proceeds to block 320, where the camera adjusts the focus point and camera settings to achieve the desired photograph of the user. The process then proceeds to block 322.

In block 322, the photograph is taken. In one embodiment, the photograph may be taken by the user. In another embodiment, the photograph may automatically be taken by the camera after the proper camera settings have been adjusted.

Figure 6:
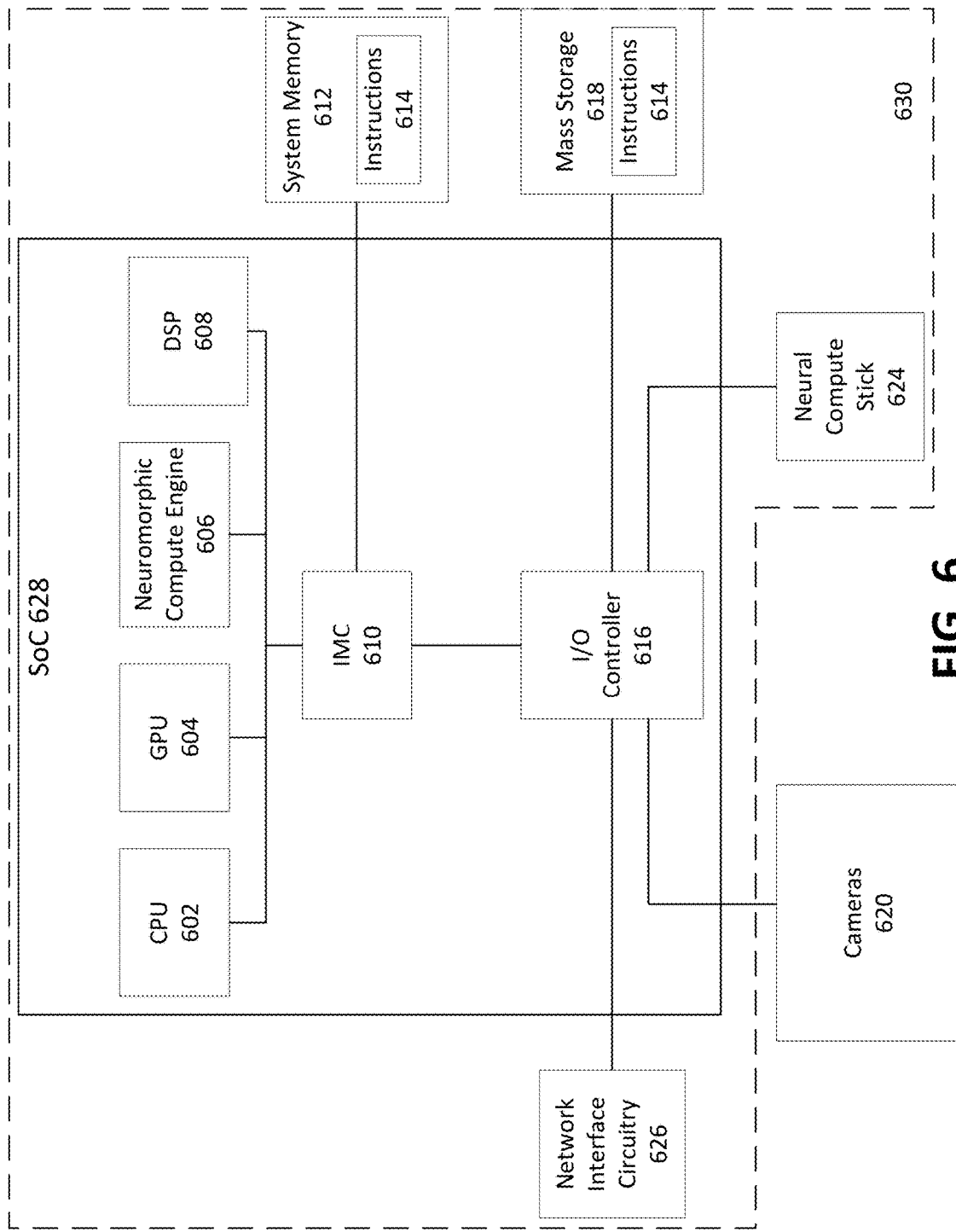
FIG. 6 is an exemplary block diagram of a camera system 600 for precise focusing of a voice-controlled camera using AI scene detection according to an embodiment.

FIG. 6 is an exemplary block diagram of a camera system 600 for precise focusing of a voice-controlled camera using AI scene detection according to an embodiment. Camera system 600 includes a computer system 630 coupled to a camera 620. The camera 620 includes a microphone (not explicitly shown) to receive voice-controlled instructions from a user. In one embodiment, the camera 620 may include, for example, Intel® RealSense™ sensors for measuring depth of objects in an image.

The computer system 630 includes multiprocessors such as a first processor 602 (e.g., host processor, central processing unit/CPU) and a second processor 604 (e.g., graphics processing unit/GPU). The first processor or CPU 602 is the central or main processor for carrying out instructions of computer programs, such as, for example, a method for precise focusing of a voice-controlled camera using AI scene detection. The second processor or GPU 604 is primarily used to render 3D graphics. The GPU 604 may also be utilized to assist the CPU 602 in non-graphics computations. The CPU 602 and/or the GPU 604 may include a core region with one or more processor cores (not shown).

The computer system 630 also includes multiple compute engines to provide artificial machine intelligence. The compute engines include a neuromorphic compute engine 606 and a DSP (Digital Signal Processor) 608. The neuromorphic compute engine 606 is a hardware based accelerator used to increase the performance of deep neural networks. The neuromorphic compute engine 606 may be used to run neural networks, such as, for example, neural networks used to perform NLP and AI scene detection as described above. The DSP 608 is an on-chip hardware block designed to run deep neural networks at high speed and low power without compromising accuracy. The DSP 608 may be used to accelerate deep learning inferences at the edge. Thus, the DSP 608 may be used for machine learning to train a classifier to recognize voice-controlled camera commands and to detect objects in a scene captured by the camera 620 using semantic segmentation in real-time.

The CPU 602, GPU 604, and the compute engines 606 and 608 are communicatively coupled to an integrated memory controller (IMC) 610. The IMC 610 is coupled to a system memory 612 (volatile memory, 3D) XPoint memory). The CPU 602, GPU 604, and the compute engines 606 and 608 may also be coupled to an input/output (I/O) module 616 that communicates with mass storage 618 (e.g., non-volatile memory/NVM, hard disk drive/HDD, optical disk, solid state disk/SSD, flash memory), the camera 620, one or more neural compute sticks (NCS) 624, such as, for example, the Intel® Movidius™ NCS (a USB-based deep learning/self-contained device used for artificial intelligence (AI) programming at the edge), and network interface circuitry 626 (e.g., network controller, network interface card/NIC).

The one or more NCS(s) 624 may provide dedicated deep neural network capabilities to the multiprocessors (602 and 604) and the compute engines (606 and 608) at the edge. Each of the one or more NCS(s) 624 include a VPU (Vision Processing Unit) to run real-time deep neural networks directly from the device to deliver dedicated high performance processing in a small form factor. In embodiments, the one or more NCS(s) 624 may be used to perform pattern matching based on the classifier trained to recognize voice-controlled camera instructions and/or detect objects in images captured by camera 620.

The network interface circuitry 626 may provide off platform communication functionality for a wide variety of purposes, such as, for example, cellular telephone (e.g., Wideband Code Division Multiple Access/W-CDMA (Universal Mobile Telecommunications System/UMTS), CDMA2000 (IS-856/IS-2000), etc.), WiFi (Wireless Fidelity, e.g., Institute of Electrical and Electronics Engineers/IEEE 802.11-2007, Wireless Local Area Network/LAN Medium Access Control (MAC) and Physical Layer (PHY) Specifications, 4G LTE (Fourth Generation Long Term Evolution), Bluetooth, WiMax (e.g., IEEE 802.16-2004, LAN/MAN Broadband Wireless LANS), Global Positioning System (GPS), spread spectrum (e.g., 900 MHz), and other radio frequency (RF) telephony purposes. Other standards and/or technologies may also be implemented in the network interface circuitry 626. In one embodiment, the network interface circuitry 626 may enable communication with various cloud services to perform AI tasks in the cloud.

Although the CPU 602, the GPU 604, the compute engines 606 and 608, the IMC 610, and the I/O controller 616 are illustrated as separate blocks, these components may be implemented as a system on chip (SoC) 628 on the same semiconductor die.

The system memory 612 and/or the mass memory 618 may be memory devices that store instructions 614, which when executed by the processors 602 and/or 604 or the compute engines 606 and/or 608, cause the camera system 600 to perform one or more aspects of method 300 for precise focusing of a voice-controlled camera using AI scene detection, described above with reference to FIG. 3. Thus, execution of the instructions 614 may cause the camera system 600 to adjust settings on the camera 620 to provide precise focusing of images desired by the user to be captured by the cameras 620.

In another embodiment, the computer system 630 may be integrated onto camera 620. In this instance, all deep learning techniques may be performed directly on camera 620.

Figure 7:
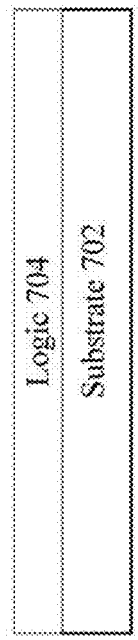
FIG. 7 is an illustration of an example of a semiconductor package apparatus according to an embodiment.

FIG. 7 shows a semiconductor package apparatus 700 (e.g., chip) that includes a substrate 702 (e.g., silicon, sapphire, gallium arsenide) and logic 704 (e.g., transistor array and other integrated circuit/IC components) coupled to the substrate 702. The logic 704, which may be implemented in configurable logic and/or fixed-functionality logic hardware, may generally implement one or more aspects of the method 300 (FIG. 3), already discussed.

Figure 8:
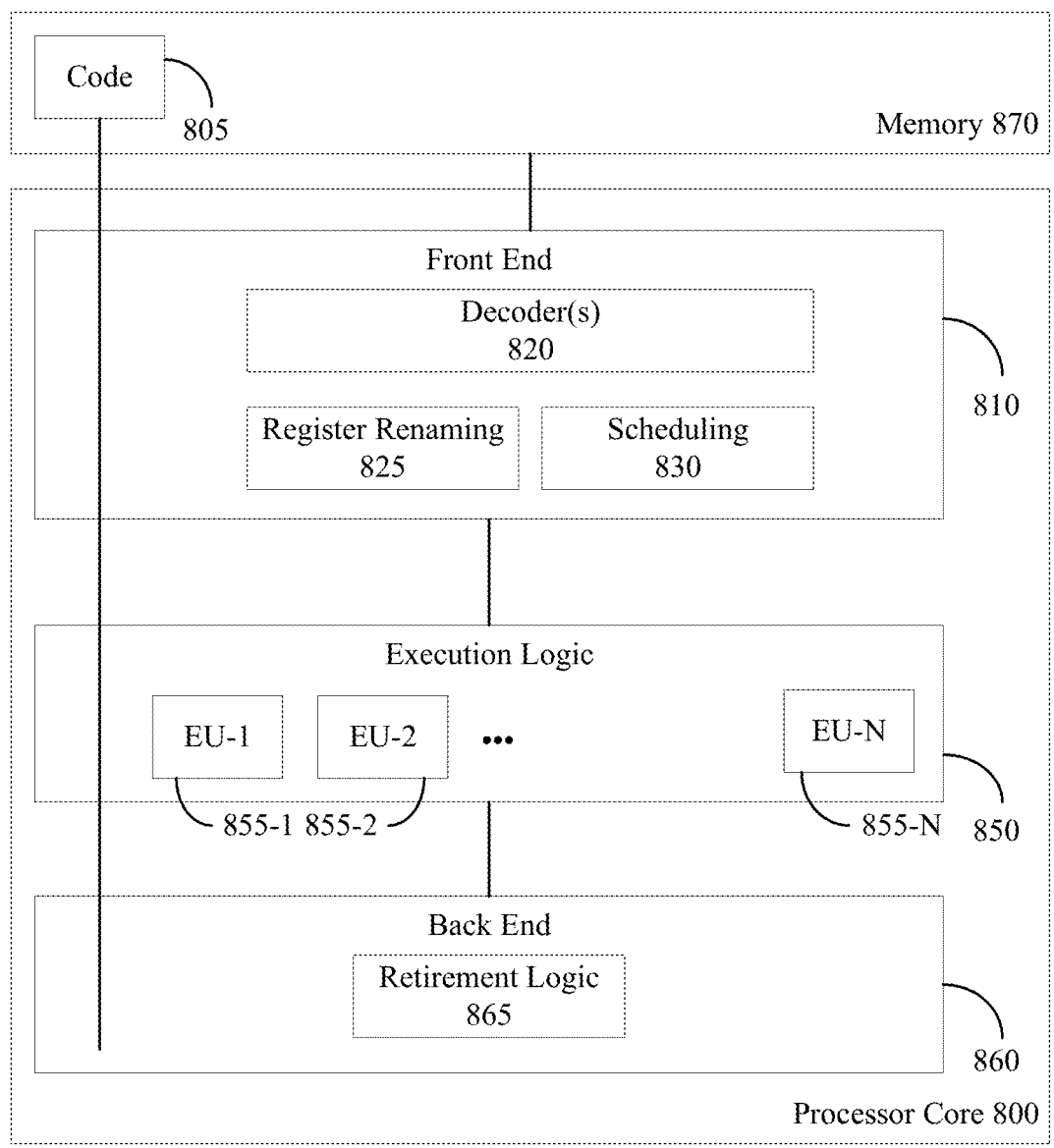
FIG. 8 is a block diagram of an exemplary processor according to an embodiment.

FIG. 8 illustrates a processor core 800 according to one embodiment. The processor core 800 may be the core for any type of processor, such as a micro-processor, an embedded processor, a digital signal processor (DSP), a network processor, or other device to execute code. Although only one processor core 800 is illustrated in FIG. 8, a processing element may alternatively include more than one of the processor core 800 illustrated in FIG. 8. The processor core 800 may be a single-threaded core or, for at least one embodiment, the processor core 800 may be multithreaded in that it may include more than one hardware thread context (or "logical processor") per core.

FIG. 8 also illustrates a memory 870 coupled to the processor core 800. The memory 870 may be any of a wide variety of memories (including various layers of memory hierarchy) as are known or otherwise available to those of skill in the art. The memory 870 may include one or more code 805 instruction(s) to be executed by the processor core 800, wherein the code 805 may implement the method 300 (FIG. 3), already discussed. The processor core 800 follows a program sequence of instructions indicated by the code 805. Each instruction may enter a front end portion 810 and be processed by one or more decoders 820. The decoder 820 may generate as its output a micro operation such as a fixed width micro operation in a predefined format, or may generate other instructions, microinstructions, or control signals which reflect the original code instruction. The illustrated front end portion 810 also includes register renaming logic 825 and scheduling logic 830, which generally allocate resources and queue the operation corresponding to the convert instruction for execution.

The processor core 800 is shown including execution logic 850 having a set of execution units 855-1 through 855-N. Some embodiments may include a number of execution units dedicated to specific functions or sets of functions. Other embodiments may include only one execution unit or one execution unit that can perform a particular function. The illustrated execution logic 850 performs the operations specified by code instructions.

After completion of execution of the operations specified by the code instructions, back end logic 860 retires the instructions of the code 805. In one embodiment, the processor core 800 allows out of order execution but requires in order retirement of instructions. Retirement logic 865 may take a variety of forms as known to those of skill in the art (e.g., re-order buffers or the like). In this manner, the processor core 800 is transformed during execution of the code 805, at least in terms of the output generated by the decoder, the hardware registers and tables utilized by the register renaming logic 825, and any registers (not shown) modified by the execution logic 850.

Although not illustrated in FIG. 8, a processing element may include other elements on chip with the processor core 800. For example, a processing element may include memory control logic along with the processor core 800. The processing element may include I/O control logic and/or may include I/O control logic integrated with memory control logic. The processing element may also include one or more caches.

ADDITIONAL NOTES AND EXAMPLES

Example 1 may include a system for performing precise focusing comprising a camera, the camera having a microphone to receive natural language instructions (NLIs) from a user for focusing the camera to achieve a desired photograph, the camera coupled to one or more processors, the one or more processors coupled to one or more memory devices, the one or more memory devices including instructions, which when executed by the one or more processors, cause the system to process the NLIs for understanding using natural language processing (NLP) techniques, capture a preview image of a user desired scene and apply artificial intelligence (AI) to the preview image to obtain context and to detect objects within the preview image, generate a depth map of the preview image to obtain distances of detected objects in the preview image to the camera, when the detected objects match the NLIs, determine and adjust camera focus point and camera settings based on the NLIs to obtain the desired user image, and take a photograph of the desired user image.

Example 2 may include the system of example 1, wherein the photograph is taken automatically by the camera.

Example 3 may include the system of example 1, wherein the user is prompted to take the photograph using the camera.

Example 4 may include the system of example 1, wherein when the detected objects in the image do not match the NLIs from the user, the one or more memory devices including further instructions, which when executed by the one or more processors, cause the system to recapture the preview image of the user desired scene, apply the AI to the preview image to obtain the context and to detect the objects within the preview image, generate the depth map of the preview image to obtain the distances from the detected objects in the preview image to the camera, when the detected objects in the preview image match the NLIs, determine and adjust the camera focus point and the camera settings based on the NLIs of the user to obtain the desired user image, and take the photograph of the desired user image.

Example 5 may include the system of example 1, wherein the camera continuously listens, via a microphone, to voice commands from the user based on a wake word, the wake word to operate as a trigger to inform the camera that the voice commands following the wake word are instructions for focusing the camera to achieve the desired photograph of the user.

Example 6 may include the system of example 1, wherein NLP uses deep learning techniques based on dense vector representations, wherein the deep learning techniques include one or more of Convolutional Neural Networks (CNN), Recurrent Neural Networks (RNN), and recursive neural networks.

Example 7 may include the system of example 1, wherein AI uses Semantic Segmentation in real-time using Fully Convolutional Networks (FCN), R-CNN (Regional-based Convolutional Neural Network), Fast R-CNN, Faster R-CNN, YOLO (You Only Look Once), and Mask R-CNN Using TensorRT, or a combination of one or more of the above.

Example 8 may include the system of example 1, wherein the camera focus point and the camera settings are determined by calculating optical formulas for cameras based on the identified objects to be photographed, their position in the preview image, and their estimated depth or distance to the camera.

Example 9 may include the system of example 1, wherein the camera focus point and the camera settings are determined through experimentation by selecting a camera parameter and viewing an image of that selection using depth of field preview, wherein if the image is not good, continuously changing the camera parameter and viewing the image until the image is correct.

Example 10 may include the system of example 1, wherein instructions to receive and process the NLIs and capture and apply AI to the preview image are simultaneously performed.

Example 11 may include a semiconductor package apparatus comprising one or more substrates, and logic coupled to the one or more substrates, wherein the logic includes one or more of configurable logic or fixed-functionality hardware logic, the logic coupled to the one or more substrates to receive natural language instructions (NLIs) from a user for focusing the camera to achieve a desired photograph, wherein the NLIs are processed using natural language processing (NLP) techniques to understand the instructions, capture a preview image of a user desired scene to apply artificial intelligence (AI) to the preview image to obtain context and to detect objects within the preview image, generate a depth map of the preview image to obtain distances of detected objects in the preview image to the camera, when the detected objects in the preview image match, determine and adjust camera focus point and camera settings based on the NLIs of the user to obtain the desired user image, and take a photograph of the desired user image.

Example 12 may include the apparatus of example 11, wherein the photograph is taken automatically by the camera.

Example 13 may include the apparatus of example 11, wherein the user is prompted to take the photograph using the camera.

Example 14 may include the apparatus of example 11, wherein when the detected objects in the image do not match the NLIs from the user, the logic coupled to the one or more substrates to recapture the preview image of the user desired scene, apply the AI to the preview image to obtain the context and to detect the objects within the preview image, generate the depth map of the preview image to obtain the distances from the detected objects in the preview image to the camera when the detected objects in the preview image match the NLIs, the logic coupled to the one or more substrates to determine and adjust the camera focus point and the camera settings based on the NLIs of the user to obtain the desired user image, and take the photograph of the desired user image.

Example 15 may include the apparatus of example 11, wherein the camera continuously listens, via a microphone, to voice commands from the user based on a wake word, the wake word to operate as a trigger to inform the camera that the voice commands following the wake word are instructions for focusing the camera to achieve a desired photograph of the user.

Example 16 may include the apparatus of example 11, wherein NLP uses deep learning techniques based on dense vector representations, wherein the deep learning techniques include one or more of Convolutional Neural Networks (CNN), Recurrent Neural Networks (RNN), and recursive neural networks.

Example 17 may include the apparatus of example 11, wherein AI uses Semantic Segmentation in real-time using Fully Convolutional Networks (FCN), R-CNN (Regional-based Convolutional Neural Network), Fast R-CNN, Faster R-CNN, YOLO (You Only Look Once), and Mask R-CNN Using TensorRT, or a combination of one or more of the above.

Example 18 may include the apparatus of example 11, wherein the camera focus point and the camera settings are determined by calculating optical formulas for cameras based on the identified objects to be photographed, their position in the preview image, and their estimated depth or distance to the camera.

Example 19 may include the apparatus of example 11, wherein the camera focus point and the camera settings are determined through experimentation by selecting a camera parameter and viewing an image of that selection using depth of field preview, wherein if the image is not good, continuously changing the camera parameter and viewing the image until the image is correct.

Example 20 may include the apparatus of example 11, wherein logic to receive and process the NLIs and capture and apply AI to the preview image are simultaneously performed.

Example 21 may include a method of performing precise focusing of a camera comprising receiving, by the camera, natural language instructions (NLIs) from a user for focusing the camera to achieve a desired photograph, wherein the NLIs are processed to understand the instructions using natural language processing (NLP), capturing, by the camera, a preview image of a user desired scene, wherein artificial intelligence (AI) is applied to the preview image to obtain context and to detect objects, generating a depth map of the preview image to obtain distances of detected objects in the preview image to the camera, when the detected objects in the preview image match the NLIs, determining camera focus point and camera settings based on the NLIs and adjusting the camera focus point and the camera settings to obtain the desired user image, and taking a photograph of the desired user image.

Example 22 may include the method of example 21, wherein the photograph is taken automatically by the camera.

Example 23 may include the method of example 21, wherein the user is prompted to take the photograph.

Example 24 may include the method of example 21, wherein when the detected objects in the image do not match the NLIs, recapturing, by the camera, the preview image of the user desired scene, applying the AI to the preview image to obtain the context and to detect the objects within the preview image, generating the depth map of the preview image to obtain the distances from the detected objects in the preview image to the camera, when the detected objects in the preview image match the NLIs, determining the camera focus point and the camera settings based on the NLIs and adjusting the camera focus point and the camera settings to obtain the desired user image, and taking the photograph of the desired user image.

Example 25 may include the method of example 21, wherein the camera continuously listens, via a microphone, to voice commands from the user based on a wake word, the wake word to operate as a trigger to inform the camera that the voice commands following the wake word are instructions for focusing the camera to achieve a desired photograph of the user.

Example 26 may include the method of example 21, wherein NLP uses deep learning techniques based on dense vector representations, wherein the deep learning techniques include one or more of Convolutional Neural Networks (CNN), Recurrent Neural Networks (RNN), and recursive neural networks.

Example 27 may include the method of example 21, wherein artificial intelligence uses Semantic Segmentation in real-time using Fully Convolutional Networks (FCN), R-CNN (Regional-based Convolutional Neural Network), Fast R-CNN, Faster R-CNN, YOLO (You Only Look Once), and Mask R-CNN Using TensorRT, or a combination of one or more of the above.

Example 28 may include the method of example 21, wherein the camera focus point and the camera settings are determined by calculating optical formulas for cameras based on the identified objects to be photographed, their position in the preview image, and their estimated depth or distance to the camera.

Example 29 may include the method of example 21, wherein the camera focus point and the camera settings are determined through experimentation by selecting a camera parameter and viewing an image of that selection using depth of field preview, wherein if the image is not good, continuously changing the camera parameter and viewing the image until the image is correct.

Example 30 may include the method of example 21, wherein receiving and processing the natural language instructions and capturing and applying AI to the preview image are performed simultaneously.

Example 31 may include at least one computer readable medium, comprising a set of instructions, which when executed by one or more computing devices, cause the one or more computing devices to receive, by the camera, natural language instructions (NLIs) from a user for focusing the camera to achieve a desired photograph, wherein the NLIs are processed to understand the instructions using natural language processing (NLP), capture, by the camera, a preview image of a user desired scene, wherein artificial intelligence (AI) is applied to the preview image to obtain context and to detect objects, generate a depth map of the preview image to obtain distances of detected objects in the preview image to the camera, when the detected objects in the preview image match the NLIs, determine camera focus point and camera settings based on the NLIs and adjust the camera focus point and the camera settings to obtain the desired user image, and take a photograph of the desired user image.

Example 32 may include the at least one computer readable medium of example 31, wherein the photograph is taken automatically by the camera.

Example 33 may include the at least one computer readable medium of example 31, wherein the user is prompted to take the photograph.

Example 34 may include the at least one computer readable medium of example 31, wherein when the detected objects in the image do not match the NLIs, the instructions, which when executed by one or more computing devices, further cause the one or more computing devices to recapture, by the camera, the preview image of the user desired scene, apply the AI to the preview image to obtain the context and to detect the objects within the preview image, generate the depth map of the preview image to obtain the distances from the detected objects in the preview image to the camera, when the detected objects in the preview image match the NLIs, determine the camera focus point and the camera settings based on the NLIs and adjust the camera focus point and the camera settings to obtain the desired user image, and take the photograph of the desired user image.

Example 35 may include the at least one computer readable medium of example 31, wherein the camera continuously listens, via a microphone, to voice commands from the user based on a wake word, the wake word to operate as a trigger to inform the camera that the voice commands following the wake word are instructions for focusing the camera to achieve a desired photograph of the user.

Example 36 may include the at least one computer readable medium of example 31, wherein NLP uses deep learning techniques based on dense vector representations, wherein the deep learning techniques include one or more of Convolutional Neural Networks (CNN), Recurrent Neural Networks (RNN), and recursive neural networks.

Example 37 may include the at least one computer readable medium of example 31, wherein artificial intelligence uses Semantic Segmentation in real-time using Fully Convolutional Networks (FCN), R-CNN (Regional-based Convolutional Neural Network), Fast R-CNN, Faster R-CNN, YOLO (You Only Look Once), and Mask R-CNN Using TensorRT, or a combination of one or more of the above.

Example 38 may include the at least one computer readable medium of example 31, wherein the camera focus point and the camera settings are determined by calculating optical formulas for cameras based on the identified objects to be photographed, their position in the preview image, and their estimated depth or distance to the camera.

Example 39 may include the at least one computer readable medium of example 31, wherein the camera focus point and the camera settings are determined through experimentation by selecting a camera parameter and viewing an image of that selection using depth of field preview, wherein if the image is not good, continuously changing the camera parameter and viewing the image until the image is correct.

Example 40 may include the at least one computer readable medium of example 31, wherein instructions to receive and process the NLIs and capture and apply AI to the preview image are performed simultaneously.

Example 41 may include an apparatus for performing precise focusing of a camera comprising means for receiving, by the camera, natural language instructions (NLIs) from a user for focusing the camera to achieve a desired photograph, wherein the NLIs are processed to understand the instructions using natural language processing (NLP), means for capturing, by the camera, a preview image of a user desired scene, wherein artificial intelligence (AI) is applied to the preview image to obtain context and to detect objects, means for generating a depth map of the preview image to obtain distances of detected objects in the preview image to the camera, when the detected objects in the preview image match the NLIs, means for determining camera focus point and camera settings based on the NLIs and means for adjusting the camera focus point and the camera settings to obtain the desired user image, and means for taking a photograph of the desired user image.

Example 42 may include the apparatus of example 41, wherein the photograph is taken automatically by the camera.

Example 43 may include the apparatus of example 41, wherein the user is prompted to take the photograph.

Example 44 may include the apparatus of example 41, wherein when the detected objects in the image do not match the NLIs, the apparatus further comprising means for recapturing, by the camera, the preview image of the user desired scene, means for applying the AI to the preview image to obtain the context and to detect the objects within the preview image, means for generating the depth map of the preview image to obtain the distances from the detected objects in the preview image to the camera, when the detected objects in the preview image match the NLIs, means for determining the camera focus point and the camera settings based on the NLIs and means for adjusting the camera focus point and the camera settings to obtain the desired user image, and means for taking the photograph of the desired user image.

Example 45 may include the apparatus of example 41, wherein the camera continuously listens, via a microphone, to voice commands from the user based on a wake word, the wake word to operate as a trigger to inform the camera that the voice commands following the wake word are instructions for focusing the camera to achieve a desired photograph of the user.

Example 46 may include the apparatus of example 41, wherein NLP uses deep learning techniques based on dense vector representations, wherein the deep learning techniques include one or more of Convolutional Neural Networks (CNN), Recurrent Neural Networks (RNN), and recursive neural networks.

Example 47 may include the apparatus of example 41, wherein artificial intelligence uses Semantic Segmentation in real-time using Fully Convolutional Networks (FCN), R-CNN (Regional-based Convolutional Neural Network), Fast R-CNN, Faster R-CNN, YOLO (You Only Look Once), and Mask R-CNN Using TensorRT, or a combination of one or more of the above.

Example 48 may include the apparatus of example 41, wherein the camera focus point and the camera settings are determined by calculating optical formulas for cameras based on the identified objects to be photographed, their position in the preview image, and their estimated depth or distance to the camera.

Example 49 may include the apparatus of example 41, wherein the camera focus point and the camera settings are determined through experimentation by selecting a camera parameter and viewing an image of that selection using depth of field preview, wherein if the image is not good, continuously changing the camera parameter and viewing the image until the image is correct.

Example 50 may include the apparatus of example 41, wherein means for receiving and processing the natural language instructions and means for capturing and applying AI to the preview image are performed simultaneously.

Example 51 may include at least one computer readable medium comprising a set of instructions, which when executed by a computing system, cause the computing system to perform the method of any one of examples 21 to 30.

Example 52 may include an apparatus comprising means for performing the method of any one of examples 21 to 30.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A system for performing precise focusing comprising:
   a camera, the camera having a microphone to receive natural language instructions (NLIs) from a user for focusing the camera on one or more objects to achieve a desired user image;
   the camera coupled to one or more processors, the one or more processors coupled to one or more memory devices, the one or more memory devices including instructions, which when executed by the one or more processors, cause the system to:
   process the NLIs for understanding using natural language processing (NLP) techniques;
   capture a preview image of the desired user image and apply artificial intelligence (AI) scene analysis to the preview image to obtain context and to detect the one or more objects within the preview image;
   generate a depth map of the preview image to obtain distances of detected objects in the preview image to the camera;
   when the detected objects match the NLIs, determine and adjust camera focus point and camera settings based on the NLIs to obtain the desired user image; and
   take a photograph of the desired user image.

2. The system of claim 1, wherein when the detected objects in the image do not match the NLIs from the user, the one or more memory devices including further instructions, which when executed by the one or more processors, cause the system to:
   recapture the preview image of the desired user image;
   apply the AI scene analysis to the preview image to obtain the context and to detect the one or more objects within the preview image;
   generate the depth map of the preview image to obtain the distances from the detected objects in the preview image to the camera;
   when the detected objects in the preview image match the NLIs, determine and adjust the camera focus point and the camera settings based on the NLIs of the user to obtain the desired user image; and
   take the photograph of the desired user image.

3. The system of claim 1, wherein the camera continuously listens, via a microphone, to voice commands from the user based on a wake word, the wake word to operate as a trigger to inform the camera that the voice commands following the wake word are instructions for focusing the camera to achieve the desired user image.

4. The system of claim 1, wherein NLP uses deep learning techniques based on dense vector representations, wherein the deep learning techniques include one or more of Convolutional Neural Networks (CNN), Recurrent Neural Networks (RNN), and recursive neural networks.

5. The system of claim 1, wherein the AI scene analysis uses Semantic Segmentation in real-time using Fully Convolutional Networks (FCN), R-CNN (Regional-based Convolutional Neural Network), Fast R-CNN, Faster R-CNN, YOLO (You Only Look Once), and Mask R-CNN Using TensorRT, or a combination of one or more of the above.

6. The system of claim 1, wherein the camera focus point and the camera settings are determined by calculating optical formulas for cameras based on the detected objects to be photographed, their position in the preview image, and their estimated depth or distance to the camera.

7. The system of claim 1, wherein the camera focus point and the camera settings are determined through experimentation by selecting a camera parameter and viewing an image of that selection using depth of field preview, wherein if the image is not good, continuously changing the camera parameter and viewing the image until the image is correct.

8. A method of performing precise focusing of a camera comprising:
- receiving, by the camera, natural language instructions (NLIs) from a user for focusing the camera on one or more objects to achieve a desired user image, wherein the NLIs are processed to understand the instructions using natural language processing (NLP);
- capturing, by the camera, a preview image of the desired user image, wherein artificial intelligence (AI) scene analysis is applied to the preview image to obtain context and to detect the one or more objects within the preview image;
- generating a depth map of the preview image to obtain distances of detected objects in the preview image to the camera;
- when the detected objects in the preview image match the NLIs, determining camera focus point and camera settings based on the NLIs and adjusting the camera focus point and the camera settings to obtain the desired user image; and
- taking a photograph of the desired user image.

9. The method of claim 8, wherein the photograph is taken automatically by the camera.

10. The method of claim 8, wherein the user is prompted to take the photograph.

11. The method of claim 8, wherein when the detected objects in the image do not match the NLIs,
- recapturing, by the camera, the preview image of the desired user image;
- applying the AI scene analysis to the preview image to obtain the context and to detect the one or more objects within the preview image;
- generating the depth map of the preview image to obtain the distances from the detected objects in the preview image to the camera;
- when the detected objects in the preview image match the NLIs, determining the camera focus point and the camera settings based on the NLIs and adjusting the camera focus point and the camera settings to obtain the desired user image; and
- taking the photograph of the desired user image.

12. The method of claim 8, wherein the camera continuously listens, via a microphone, to voice commands from the user based on a wake word, the wake word to operate as a trigger to inform the camera that the voice commands following the wake word are instructions for focusing the camera to achieve the desired user image.

13. The method of claim 8, wherein NLP uses deep learning techniques based on dense vector representations, wherein the deep learning techniques include one or more of Convolutional Neural Networks (CNN), Recurrent Neural Networks (RNN), and recursive neural networks.

14. The method of claim 8, wherein the artificial intelligence scene analysis uses Semantic Segmentation in real-time using Fully Convolutional Networks (FCN), R-CNN (Regional-based Convolutional Neural Network), Fast R-CNN, Faster R-CNN, YOLO (You Only Look Once), and Mask R-CNN Using TensorRT, or a combination of one or more of the above.

15. The method of claim 8, wherein the camera focus point and the camera settings are determined by calculating optical formulas for cameras based on the detected objects to be photographed, their position in the preview image, and their estimated depth or distance to the camera.

16. The method of claim 8, wherein the camera focus point and the camera settings are determined through experimentation by selecting a camera parameter and viewing an image of that selection using depth of field preview, wherein if the image is not good, continuously changing the camera parameter and viewing the image until the image is correct.

17. The method of claim 8, wherein receiving and processing the natural language instructions and capturing and applying the AI scene analysis to the preview image are performed simultaneously.

18. At least one non-transitory computer readable medium, comprising a set of instructions, which when executed by one or more computing devices, cause the one or more computing devices to:
- receive, by the camera, natural language instructions (NLIs) from a user for focusing the camera on one or more objects to achieve a desired user image, wherein the NLIs are processed to understand the instructions using natural language processing (NLP);
- capture, by the camera, a preview image of the desired user image, wherein artificial intelligence (AI) scene analysis is applied to the preview image to obtain context and to detect the one or more objects within the preview image;
- generate a depth map of the preview image to obtain distances of detected objects in the preview image to the camera;
- when the detected objects in the preview image match the NLIs, determine camera focus point and camera settings based on the NLIs and adjust the camera focus point and the camera settings to obtain the desired user image; and
- take a photograph of the desired user image.

19. The at least one non-transitory computer readable medium of claim 18, wherein when the detected objects in the image do not match the NLIs, the instructions, which when executed by one or more computing devices, further cause the one or more computing devices to:
- recapture, by the camera, the preview image of the desired user image;
- apply the AI scene analysis to the preview image to obtain the context and to detect the one or more objects within the preview image;
- generate the depth map of the preview image to obtain the distances from the detected objects in the preview image to the camera;
- when the detected objects in the preview image match the NLIs, determine the camera focus point and the camera settings based on the NLIs and adjust the camera focus point and the camera settings to obtain the desired user image; and
- take the photograph of the desired user image.

20. The at least one non-transitory computer readable medium of claim 18, wherein the camera continuously listens, via a microphone, to voice commands from the user based on a wake word, the wake word to operate as a trigger to inform the camera that the voice commands following the wake word are instructions for focusing the camera to achieve the desired user image.

21. The at least one non-transitory computer readable medium of claim 18, wherein NLP uses deep learning techniques based on dense vector representations, wherein the deep learning techniques include one or more of Convolutional Neural Networks (CNN), Recurrent Neural Networks (RNN), and recursive neural networks.

22. The at least one non-transitory computer readable medium of claim 18, wherein the artificial intelligence scene analysis uses Semantic Segmentation in real-time using Fully Convolutional Networks (FCN), R-CNN (Regional-based Convolutional Neural Network), Fast R-CNN, Faster R-CNN, YOLO (You Only Look Once), and Mask R-CNN Using TensorRT, or a combination of one or more of the above.

23. The at least one non-transitory computer readable medium of claim 18, wherein the camera focus point and the camera settings are determined by calculating optical formulas for cameras based on the detected objects to be photographed, their position in the preview image, and their estimated depth or distance to the camera.

24. The at least one non-transitory computer readable medium of claim 18, wherein the camera focus point and the camera settings are determined through experimentation by selecting a camera parameter and viewing an image of that selection using depth of field preview, wherein if the image is not good, continuously changing the camera parameter and viewing the image until the image is correct.

25. The at least one non-transitory computer readable medium of claim 18, wherein instructions to receive and process the NLIs and capture and apply the AI scene analysis to the preview image are performed simultaneously.

\* \* \* \* \*